United States Patent [19]
Remo

[11] Patent Number: 5,824,203
[45] Date of Patent: Oct. 20, 1998

[54] METHOD AND MEANS FOR CHANGING CHARACTERISTICS OF SUBSTANCES

[75] Inventor: John L. Remo, St. James, N.Y.

[73] Assignee: SGI International, La Jolla, Calif.

[21] Appl. No.: 192,096

[22] Filed: Feb. 4, 1994

Related U.S. Application Data

[63] Continuation-in-part of Ser. No. 162,410, Dec. 3, 1993, which is a continuation of Ser. No. 832,285, Feb. 10, 1992, abandoned.

[51] Int. Cl.$^6$ .................................................... B03C 5/00
[52] U.S. Cl. ......................................... 204/559; 204/660
[58] Field of Search .................................. 204/164, 168, 204/181.8, 193, 559, 560, 561, 564, 660, 670, 671; 216/748

[56] References Cited

U.S. PATENT DOCUMENTS

| | | | |
|---|---|---|---|
| 2,257,177 | 9/1941 | Luster | 204/168 |
| 2,996,442 | 8/1961 | Eberly | 204/513 |
| 3,304,251 | 2/1967 | Walker | 204/181.8 |
| 4,208,263 | 6/1980 | Avdeh et al. | 204/188 |

OTHER PUBLICATIONS

B.J. Bailes, et al. "Production of Pulsed EHT Voltages for Electrostatic Coalescence," *Jrnl. of Electrostatics*, v.17, n.3 (Oct. 1985).

*Primary Examiner*—John Niebling
*Assistant Examiner*—Brendan Mee
*Attorney, Agent, or Firm*—Leo Stanger

[57] ABSTRACT

A method and means for changing the characteristics of a substance, particularly a viscous substance, involves passing the substance into a path, passing a solvent for that substance into the path, and subjecting the substance and the solvent to a pulsating electric field in the frequency range of 0.1 Hz to 100 Hz.

24 Claims, 5 Drawing Sheets

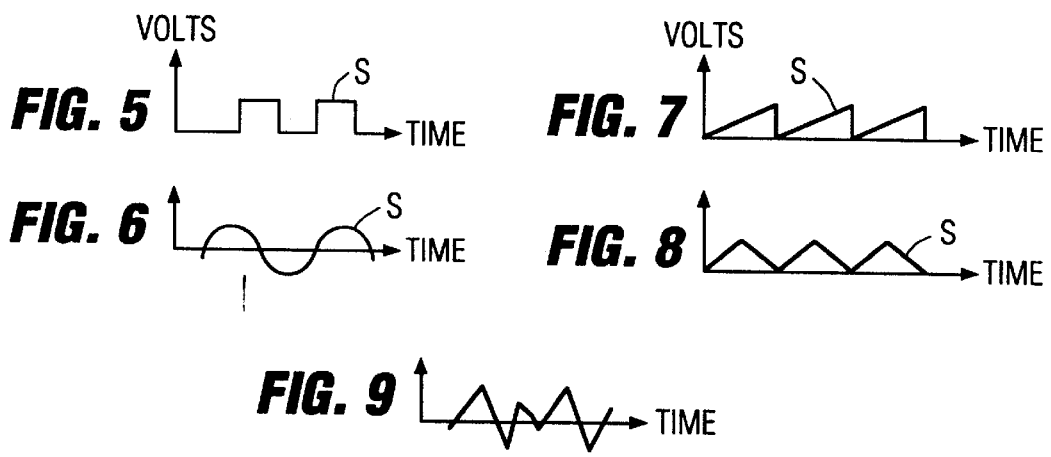
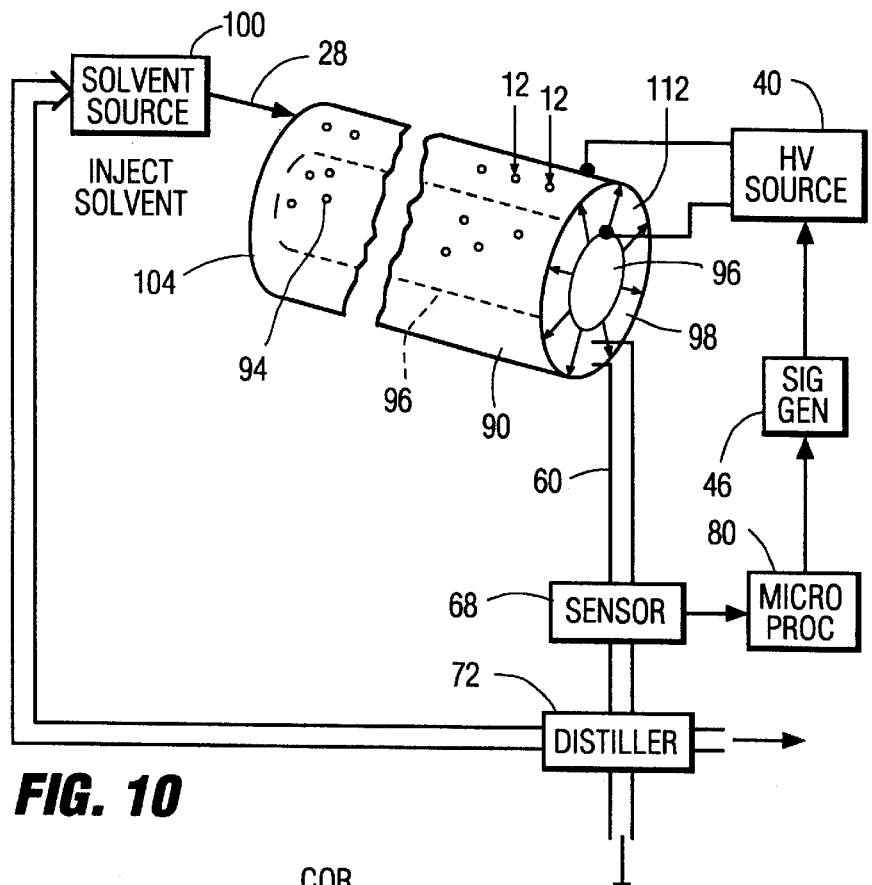
FIG. 10
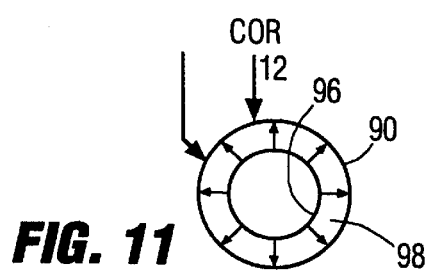
FIG. 11

METHOD AND MEANS FOR CHANGING CHARACTERISTICS OF SUBSTANCES

This is a continuation-in-part of U.S. patent application Ser. No. 08/162,410 filed Dec. 3, 1993 and of PCT application PCT/US93/01216 which are respectively a continuation and a continuation-in-part of U.S. patent application Ser. No. 07/832,285 filed 10 Feb. 1992, of John L. Remo, abandoned.

BACKGROUND OF THE INVENTION

This invention relates to changing the characteristics of substances, and particularly to untangling, stretching or otherwise unraveling very large molecular assemblages, and especially to methods and means for converting waste substances such as crude oil residues to usable substances.

It is often desirable to change the characteristics of substances to make them serviceable. Many industrial processes accomplish this end chemically or physically through mixing or interaction with other materials. However some materials are viscous or solid, so that mixing or normal interaction may demand too much time or energy to make the process worthwhile. For example, such a problem arises with waste products such as crude oil residues. These serve few useful purposes and pose environmental hazards. Most efforts have been expended in disposing of these residues such as by burning or burial. However, no simple way has been found to employ or discard such material safely. Attempts to recycle or reconstitute them, by such means as dissolving them, so they can serve a useful purpose have been largely unsuccessful.

OBJECTS AND SUMMARY OF THE INVENTION

An object of the invention is to change the characteristics of substances.

Another object is to untangle, stretch, or otherwise unravel large molecular assemblages.

Another object of the invention is to overcome these difficulties.

Another object of the invention is to reconstitute waste materials.

According to a feature of the invention, these objects are attained in whole or in part by passing the substance along a path, passing a solvent for that substance along the path, and subjecting the substance and the solvent to a pulsating electric field.

According to another feature of the invention, the field is pulsed at a frequency to create resonances in polar moments, e.g. dipoles, of large molecular assemblages in the substances so as to untangle the assemblages.

These and other features of the invention are pointed out in the claims. Other objects and advantages of the invention will become evident from the following description when read in light of the accompanying drawings.

BRIEF DESCRIPTION OF THE DRAWINGS

FIGS. 5 to 9 are graphs of waveforms usable in the circuit of FIG. 1.

FIGS. 10 is schematic diagram of another arrangement embodying features of the invention.

FIG. 11 is cross-section 11—11 of a portion of FIG. 10.

DETAILED DESCRIPTION OF PREFERRED EMBODIMENTS

The invention is described with respect to the reconstitution of waste crude oil residues, although the invention may be applicable to any changes in the characteristics of substances, and particularly to untangling, stretching or otherwise unraveling very large molecular assemblages.

Figure 1:
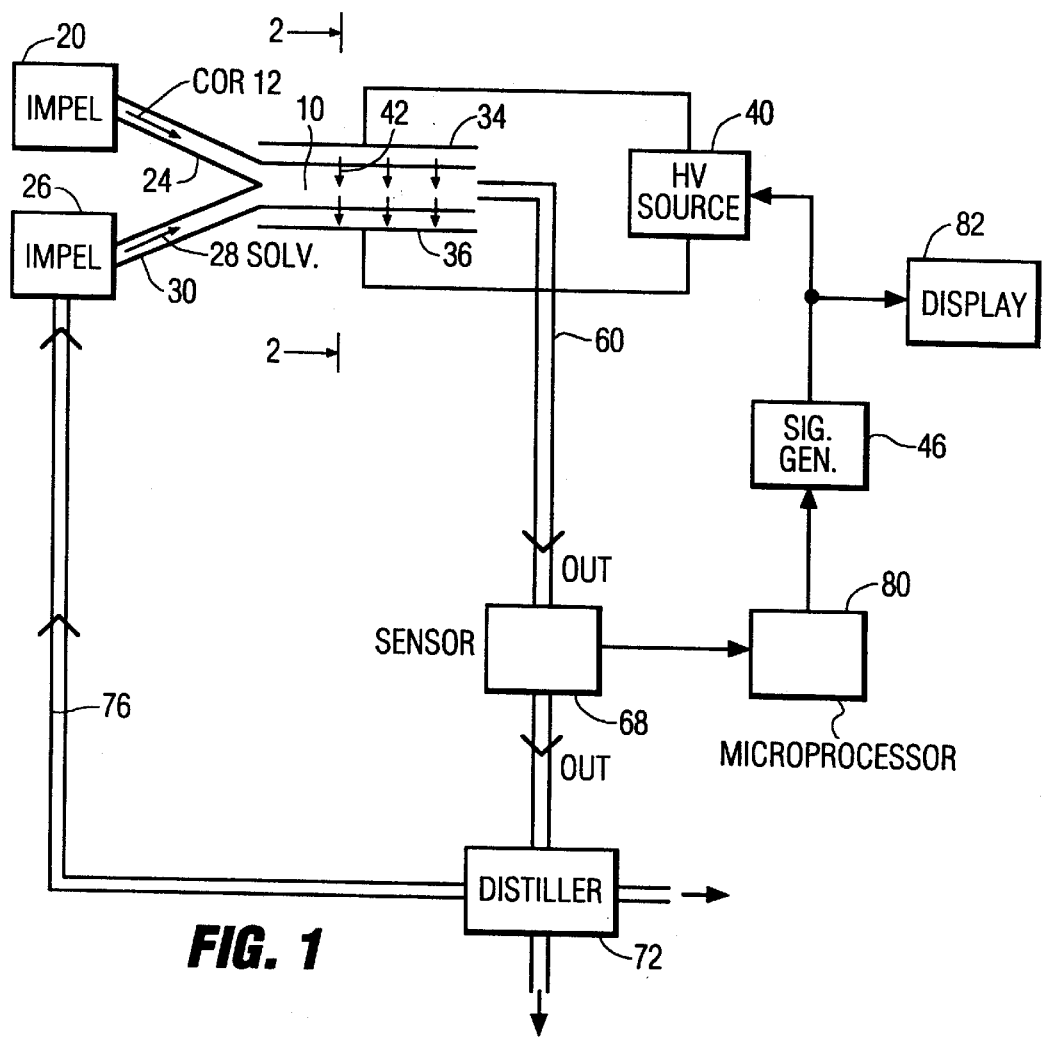
FIG. 1 is a schematic diagram of a recycling arrangement embodying features of the invention.
Figure 2:
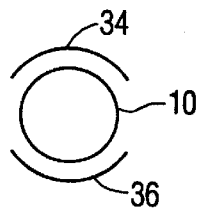
FIG. 2 is a cross-section 2—2 of a portion of FIG. 1.

In the embodiment of the invention shown in FIGS. 1 and 2, a non-conductive cylinder 10 of glass, ceramic, or other material receives crude oil residue (COR) 12 which an impeller 20 injects through a first input port 24. A second impeller 26 injects a solvent 28, such as diesel range gas oil, to the cylinder 10 through a second input port 30. According to other embodiments of the invention, the solvent is heptane, kerosene, isooctane, methylcyclohexane, ethylcyclohexane, or combinations of these.

As the COR 12 encounters and mixes with the solvent 28, opposing electrodes 34 and 36 receive a pulsating high voltage from a high voltage (HV) source 40 and impose a pulsating high voltage electric field 42 across the COR and solvent.

A signal generator 46 connected to the source 40 controls the waveform and polarity of the field which the HV source imposes on the COR 12 and solvent 28. Hence the signal generator 46 and the source 40 determine the nature of the electric field 42.

The COR 12 and solvent 28 are processed by allowing the pulsed electric field 42 to promote interactions between those materials. After sufficient processing to complete the desired interaction between the COR 12 and solvent 28, the processed material 18 is expelled from the cylinder 10 by the ejector 16. The processed material 18 is then passed by the sensor 68 which detects properties of the processed material 18. For example, the sensor 68 may measure the viscosity and opacity of the processed material 18 to determine the effectiveness of the previous processing cycle. Data on the measurements then go to a microprocessor 80 which controls the signal generator 46 to adjust the pulse amplitude and frequency during the subsequent processing cycle. The microprocessor 80 could also control the quantities of COR 12 and solvent 28 admitted to the cylinder 10 by sending appropriate signals to the impellers 20 and 26.

According to one embodiment of the invention, the field 42 is pulsed unidirectionally and according to another it is pulsed bidirectionally. According to the invention, the pulse rate may vary from 0.1 Hz to 100 Hz. Preferably the pulse rate varies from 0.3 Hz to 20 Hz, and most preferably from 0.5 Hz to 4 Hz. The voltage of the field is 3,000 to 10,000 volts and preferably 4,500 to 6,000 volts and most preferably 5,000 volts across a distance from 5 to 50 cm, preferably 7 to 30 cm, and most preferably 10 cm. However, even higher voltages and a larger range of distances are contemplated. The pulsing rate may be optimized by varying the frequency of the signal generator 46 and observing the production rate of the treated material 18.

The currents produced by these voltages are in the range of 10 microamperes to 2 milliamperes. One Kg of output requires 0.4 to 4 watts each 5 to 10 seconds. A 360 Kg output can be produced with an energy of 0.4 to 4 Kilowatt-hours.

For different applications, the voltage may be selected by varying the voltage setting of the HV supply 40 and observing the production rate of the processed material 18. Pulsation rate, rise time, and shape variation permit higher applied voltages and allow greater effective (internal to material) voltage for a given discharge.

Figure 3:
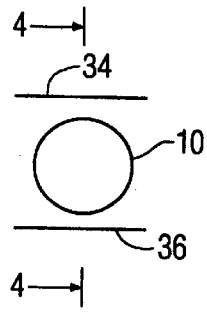
FIG. 3 is another embodiment of the cross-section in FIG. 2.
Figure 4:
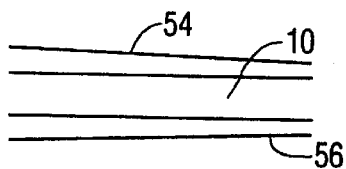
FIG. 4 is a cross-section 4—4 of FIG. 3

The cross-sectional view in FIG. 2 illustrates one shape of the electrodes 34 and 36, while FIG. 3 illustrates another shape. The longitudinal section in FIG. 4 illustrates converging electrodes which form a homogeneous field. FIGS. 5 to 8 illustrate various types of pulsed signals S generated by the signal generator 46 to control the high voltage source 40

Within the cylinder 10, the solvent 28 loosens the interaction of large polymers and polar asphaltenes are squeezed out of the COR and stabilized by the pulsating high voltage field. The solvent dilutes the COR and creates a critical level of mobility in which the asphaltenes can become free and interact with their dipoles. The high voltage pulsed field creates a high specific impulse, generates torques to break down the COR asphaltene mixture and also some H bonds. The HV field, pulsed or steady state, keeps polar and non-polar components separate.

The electric field 42 may perturb the solvation reaction in such a way that new chemical species are formed. For example, the combined effect of the solvent 28 and the electric field 42 may enable loosely bound molecular fragments attached to the asphaltenes to be released. Such molecular fragments may then form new solvent material or other valuable molecular products, which may then be recovered.

The outflow from the cylinder 10 of disentangled COR is in the form of a low viscosity fluid usable as a fuel but containing solid asphaltenes. A portion of the fluid may be utilized as a solvent. The liquid outflow viscosity may be as light as kerosene and even lighter. As shown in FIG. 1, an outflow passes to a sensor 68. A distiller 72 receives the outflow that has passed through the sensor 68 and separates it into various components 74 and 76. A pipe 78 passes some of the components back to the solvent impeller 26 for use as a solvent in the process.

The sensor 68 senses the viscosity and other characteristics of the outflow 60 and applies the sensed data to a microprocessor 80. the latter analyzes the characteristics of the outflow and controls the signals of the signal generator 46 so as to vary the output to obtain a fluid with desired characteristics. By varying the pulse shape, the pulse rise time, the pulse frequency, and the magnitude of the high voltage which the signal generator 46 imposes on the HV generator 40 on the basis of the analysis of the microprocessor 80, the system can customize the characteristics of the outflow 60. A display 82 exhibits the voltage signal from the signal generator 46. Alternatively, the display 82 could show any of the data processed by the data processor 80 including characteristics of the processed material 18 measured by the sensor 68.

Further controlling the characteristics of the interaction between the COR 12 and the solvent 28 are the mixture of polar and non-polar components and the interface parameter between the polar and non-polar components. At 100 Å, 500 Å, and 2500 Å, each parameter favors a different phase structure.

The combination of the pulsed high voltage field 42 and the solvent 28 serve to break down the COR into a thin low-viscosity fluid. Essentially the fluid is a very low viscosity petroleum product. The result is believed to occur most effectively at the boundaries between the COR 12 and the solvent 28. The COR changes from a dark viscous substance to a clear solution in the form of a translucent amber liquid. According to one embodiment cellulose, coal ash or another adsorbent adsorb the liquid to form a product that can be recycled into a solvent or used as a fuel.

Figure 12:
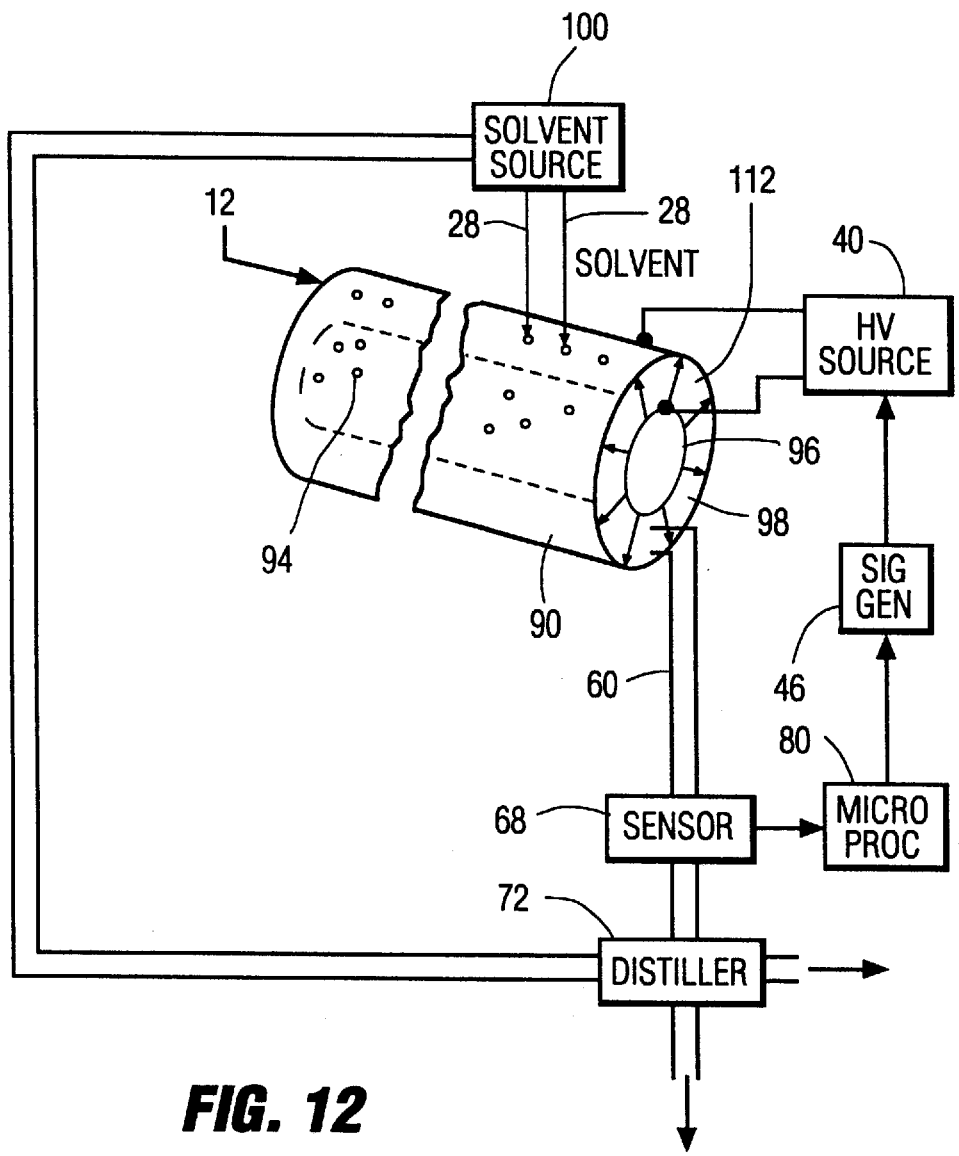
FIG. 12. is schematic diagram of yet another system embodying features of the invention

Other embodiments of the invention appear in FIGS. 10, 11, and 12 where parts corresponding to parts in the remaining figures have like reference characters. In FIGS. 10 and 11, an outer conductive cylinder 90 receives crude oil residue 12 through injection ports shown as holes 94 along its length and periphery. A concentric inner conductive cylinder 96 spaced 1 cm to 10 cm from the outer cylinder 90 by spacers (not shown) retains the COR 12 in an annular space 98 which the cylinders 90 and 96 form between them. A source 100 of solvent 28 injects the solvent at an entry end 104 of the annular space 98. A suitable impeller arrangement, not shown, drives the solvent 28 and COR 12 from the entry end 104 toward an exit end 112 of the annular space 98 to create a continuous flow of COR 12 and solvent 28 from the entry end 104 to the exit end 112.

The high voltage (HV) source 40 connected across the space 98 to the inner and outer conductive cylinders 90 and 96 establishes an inhomogeneous divergent electric field 122 of shifting value. The signal generator 46 connected to the source 40 controls the waveform and polarity of the voltage which high voltage source 40 applies to the cylinders 90 and 96. Hence, the signal generator 46 and HV source 40 determine the nature of the electric field 122 in the space 98. The COR 12 and solvent 28 passing longitudinally through the annular space 98 respond to the pulsing electric field 122 as described with respect to FIG. 1.

In FIG. 12, the application of the COR 12 and the solvent 28 differ from that of FIG. 10. Here, the solvent 28 enters the openings 94 and the COR enters the entry end 104 of the space 98. The system works otherwise like that of FIGS. 1 and 10.

Figure 13:
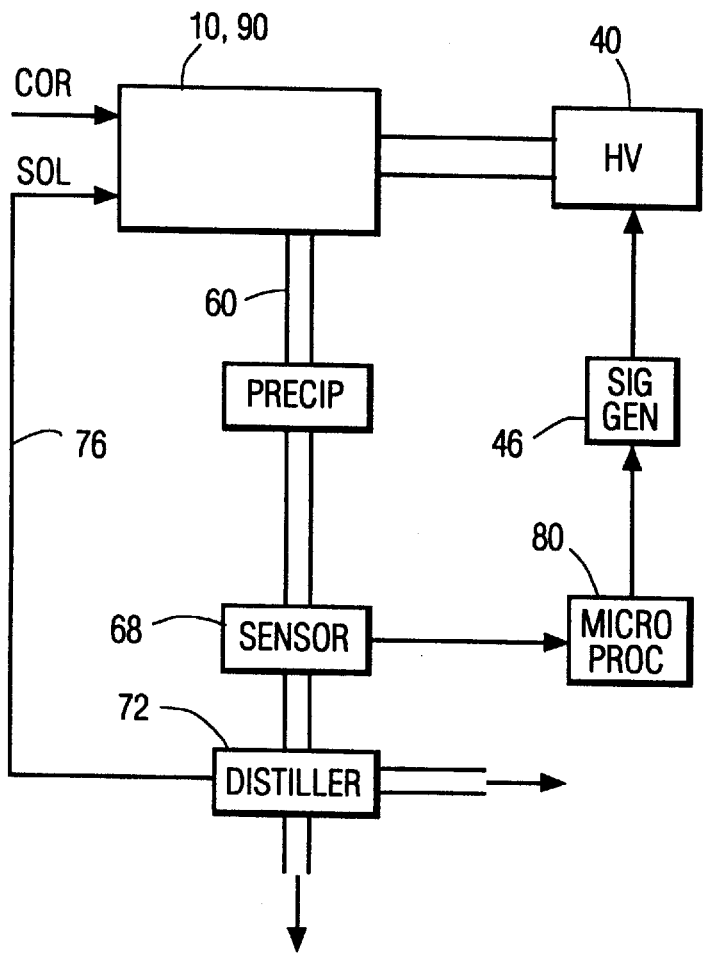
FIG. 13 is a schematic diagram of another arrangement embodying the invention.
Figure 14:
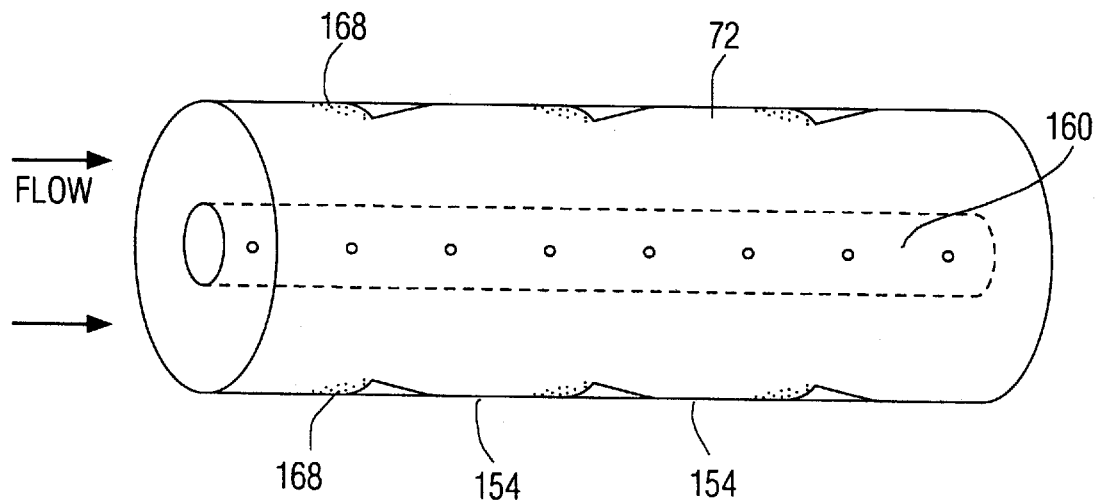
FIG. 14 is a schematic diagram of a precipitator for use in FIG. 13.

According to an embodiment of the invention, the arrangements of FIGS. 1, 10, 11, and 12 include a precipitator 144 in the line 60 to the sensor 68. Such an arrangement appears in FIG. 13 and is intended to represent this variation of the embodiments of FIGS. 1, 10, 11, and 12. The precipitator 144 removes the asphaltenes in the outflow. FIG. 14 illustrates details of the precipitator 144. In FIG. 14, the flow passes through the precipitator 144 which includes collector plates 154, baffles 158, and electrodes 160. The asphaltene particles 168 are electrostatically attracted to the electrodes 160 and are caught by the collector plates 154. The baffles 158 reduce asphaltene particle re-entrainment.

Figure 15:
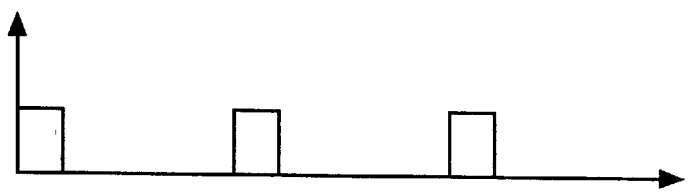
FIGS. 15, 16, and 17 illustrate various waveforms with duty cycles of approximately 20% each.
Figure 16:
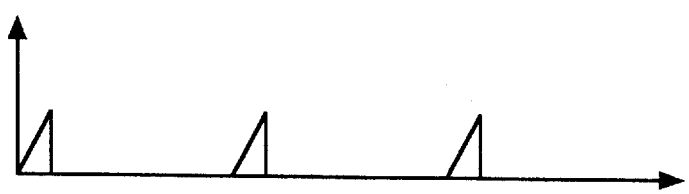
Figure 17:
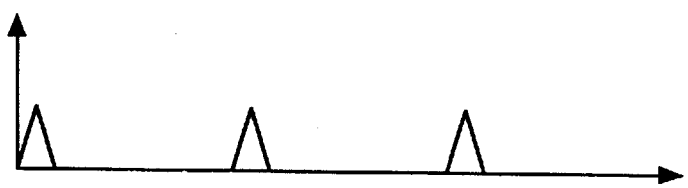

FIGS. 15, 16, and 17 illustrate various waveforms with duty cycles of approximately 20% each. Different materials respond to different duty cycles. According to an embodiment of the invention, the source 40 varies the duty cycle the basis of the sensed output of the system to achieve an optimum output.

The invention involves pulsing, and hence torquing, polar moments, e.g. dipoles, at microscopic levels to get macroscopic effects in an ordered manner. The source 40 pulses at the range of frequencies mentioned to create the torquing upon the molecules which are loosely associated, weakly bonded, in a liquid lattice and exhibit large inertia. The frequency ranges of the source 40 is significant for creating resonances which enhance the torques in the high inertia environment. This makes it unnecessary to shock the substance and break down the molecules by establishing disorder. Rather the molecules are untangled, stretched, and unraveled.

Smaller particles having diameters less than 0.2 $\mu$m are subject to diffusion charging in which ions meet the particles on account of their thermal motion.

The number of basic electronic charges varies with time t according to $$n_b=(pE_o d^2/4e)\{t/[t+(1/\pi Nek)]\}$$

where t=time
  p=3$\epsilon$/($\epsilon$+2),
  d=particle size,
  $\epsilon$=permittivity of particle
  p=3 when particles conduct,
  $E_o \equiv$ field strength to which the particle is exposed.
The self-field of the particles as they charge will act in opposition to $E_o$ so that the charging rate falls with time.

The diffusion charging rate $$dn_d/dt=(\pi d^2 sN/4) \exp(-2n_d e^2/dKT)$$

where $n_d=(dKT/2e^2) \log(1+\pi dsNe^2 t/2KT)$
where K=Boltzman's constant.
Particle migration velocity $\omega=neE_o/3\pi\mu d$.

The invention may be used in other fields to promote changing the characteristics of various substances. For example, it may be employed to accelerate or control interactions between two or more substances.

According to one embodiment the distiller 72 operates at 250 degrees C.

While embodiments of the invention have been described in detail, it will be evident to one skilled in the art that the invention may be embodied otherwise without departing from its spirit and scope.

What is claimed is:

1. The method of converting oil residues to usable substances, which comprises:
   passing the oil residues along a path;
   passing a solvent for that oil residues along the path;
   forming an electric field with a pulsating voltage in the range of 3,000 to 10,000 volts;
   untangling molecular assemblages in the oil residues by subjecting the oil residues and the solvent to the electric field at a frequency to untangle the molecular assemblages so as to change the oil residues; and
   forming said voltage with electrodes of substantially stationary relative to each other.

2. The method as in claim 1, wherein the electric field produces a current in the range of 10 microamperes to 2 milliamperes.

3. The method as in claim 1, wherein the voltage is pulsed at a frequency from 0.1 Hz to 100 Hz.

4. The method as in claim 1, wherein the voltage is pulsed at a frequency from 0.3 Hz to 20 Hz.

5. The method as in claim 1, wherein the voltage is pulsed at a frequency from 0.5 Hz to 4 Hz.

6. The method as in claim 1, wherein the step of subjecting the oil residues to the electric field formed by the voltage pulses includes torquing polar moments of molecules of the oil residues at microscopic levels to untangle, stretch or unravel the molecules.

7. The method as in claim 1, wherein the voltage is 4,500 to 6,000 volts.

8. The method as in claim 1, which further comprises passing the changed oil residues to a distiller and distilling the changed oil residues to produce fractions.

9. The method as in claim 8, wherein a portion of the fractions is a solvent fraction, and which further comprises passing the solvent fraction back to the oil residues to pass along the path.

10. The method as in claim 2, wherein the voltage is 4,500 to 6,000 volts.

11. The method as in claim 2, wherein the oil residues are crude oil residues.

12. The method as in claim 1, wherein the electrodes are arranged on opposite sides of a path and the oil residues are crude oil residues.

13. The method as in claim 1, wherein the electrodes are of substantially equal length.

14. The method as in claim 1, wherein the field is pulsed at a frequency to create resonances in polar moments of the molecular assemblages.

15. A method as in claim 1, wherein said molecular assemblages are large molecular assemblages.

16. An apparatus for changing the characteristics of oil residues, comprising:
   means forming a path;
   means for passing the oil residues along the path;
   means for passing a solvent for the oil residues along the path; and
   means for untangling molecular assemblages in the oil residues by subjecting the oil residues and the solvent to a pulsating electric field at a frequency to untangle the molecular assemblages so as to change the oil residues with a voltage in the range of 3,000 to 10,000 volts;
   said means for subjecting including a pair of mutually stationary electrodes.

17. The apparatus as in claim 16, wherein the electric field produces a current in the range of 10 microamperes to 2 milliamperes.

18. The apparatus as in claim 16, wherein the voltage is pulsed at a frequency from 0.1 Hz to 100 Hz.

19. The apparatus as in claim 16, wherein the voltage is pulsed at a frequency from 0.3 Hz to 20 Hz.

20. The apparatus as in claim 16, wherein the voltage is pulsed at a frequency from 0.5 Hz to 4 Hz.

21. The apparatus as in claim 16, wherein the means for subjecting the oil residues to pulses includes means for torquing polar moments of molecules of the oil residues at microscopic levels to untangle, stretch or unravel the molecules.

22. The apparatus as in claim 16, further comprising a distiller coupled to said means for subjecting the oil residues to the field to obtain fractions including a solvent fraction, and means coupled to the means for passing the solvent for feeding the solvent fraction back to the means for passing the solvent.

23. The apparatus as in claim 16, wherein the voltage is 5,000 volts and said electrodes are arranged on opposite sides of the path.

24. An apparatus as in claim 16, wherein said molecular assemblages are large molecular assemblages.

* * * * *